3,401,129
FLOOR TILE COMPRISING POLYVINYL
CHLORIDE, CHLORINATED POLYETHYLENE AND FILLER
John V. McGinley, Hackensack, N.J., assignor to Allied Chemical Corporation, New York, N.Y., a corporation of New York
Filed Apr. 3, 1964, Ser. No. 357,099
8 Claims. (Cl. 260—23)

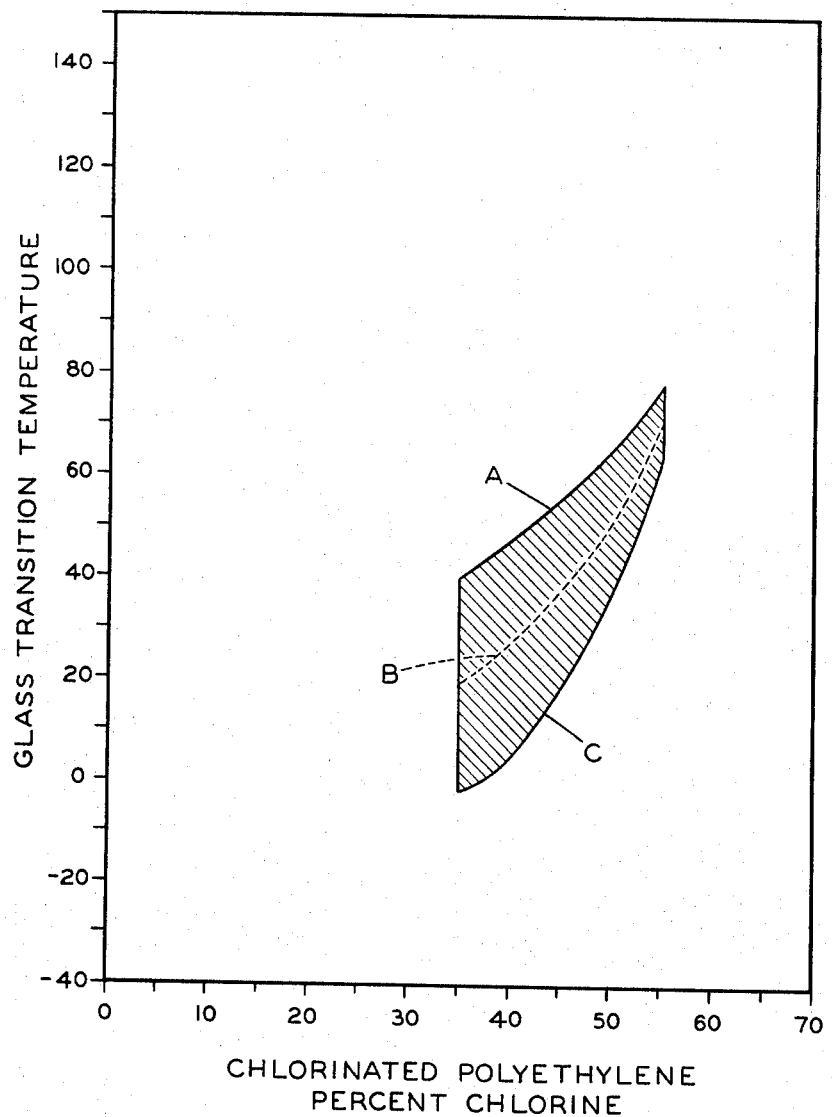

ABSTRACT OF THE DISCLOSURE

The invention more specifically relates to the provision of new and improved vinyl flooring compositions of high filler loading by incorporating in the vinyl chloride polymer binder a minor portion between about 5% to 30% of a semicrystalline chlorinated high molecular weight linear polyethylene having chlorine content between about 35–55% by weight, the incorporation of said chlorinated polyethylene also beneficially improving the manufacture of vinyl flooring while providing products of excellent overall properties and reduced cost based on the high filler loading content thereof.

---

This invention relates to vinyl floor covering, and more particularly to new and improved method of manufacture of such floor products. It also relates to new and improved vinyl floor covering.

Large quantities of filled and plasticized vinyl compositions are produced each year for use as floor covering, floor tiles and the like. In the manufacture of such compositions, the basic formulation of vinyl resin, filler and plasticizer are compounded in a machine such as a Banbury mixer and then sheeted out, usually on a mill, and thereafter calendered to produce a sheet which is press-molded into sheet flooring or punch-pressed, i.e., die cut, into tiles. The continuous sheet produced in the calendering operation is of substantial width of typically between about 54 to 72 inches. Such calendering operation has had one longstanding drawback in that the marginal edges of the calendered sheet become cracked or separated in a manner characteristically referred to as "fingering." As a result, a substantial portion of the marginal edges of the calendered sheet are worthless and it becomes necessary to trim or otherwise scrap such edge portions prior to the formation of the vinyl product in the operation. In the punch-press operations the larger cracks also result in rejection of cut tiles thereby reducing efficiency and further increasing the amount of scrap. While the loss due to such fingering or cracking may involve only about 6 inches from each side of the calendered sheet the resulting quantities of scrap produced thereby are very substantial when it is considered that better than a billion square feet of calendered sheet are now produced in the vinyl floor covering industry each year. It has of course been long desired to produce a calendered sheet which would not finger and thereby substantially reduce the resulting costly scrap operations. However, a solution to this problem has been far from a simple matter. Moreover, it is required that a solution be found which does not adversely affect the cost of the operation or the many specific properties required in combination for floor covering compositions. The industry has not heretofore found a satisfactory solution to this problem and has continued to bear the costly burden of the scrap operation.

An object of the present invention is to provide a new more efficient process for producing vinyl floor covering compositions, and specifically to substantially eliminate fingering or cracking of the marginal edges of calendered vinyl sheet materials and thereby substantially reduce the production of scrap in such operations. Another object of the invention is to provide a method for substantially eliminating the fingering characteristics of calendered vinyl sheet while simultaneously producing a low cost product having, in combination, all the properties required for floor covering. A further object of the invention is to provide new and improved vinyl floor covering products. Other objects and advantages will be evident from the following description of the invention and accompanying drawing which is a graphic diagram showing a characteristic property of a resin additive employed in the invention.

In accordance with the present invention it has been found that fingering or edge cracking of calendered sheets in the manufacture of vinyl floor covering may be eliminated at considerable savings in cost by incorporation in filled and plasticized vinyl compositions of between about 5 to 30% by weight of total resin binder of a chlorinated polyethylene having a chlorine content between about 35–55%, preferably between 40–50% by weight, a crystallinity between about 8% to 35%, preferably between about 10–30%, as measured by differential thermal analysis, a glass transition temperature ranging from about 19° C.±21° C. for the 35% chlorine content chlorinated polyethylene up to about 71° C.±7° C. for the 55% chlorine content material, and weight average molecular weight corresponding to an intrinsic viscosity of at least about 3.0 up to about 6.0 in o-dichlorobenzene at 100° C. The addition of the specified chlorinated polyethylene to the filled and plasticized vinyl compositions results in a material which may be calendered without cracking or fingering of the edges such that maximum utilization may be made of the calendered sheet and the heretofore tolerated high cost and high volume scrap operation substantially reduced. Moreover, not only is the resulting product satisfactory but also improved with respect to properties important for floor covering, for example, stain and chemical resistance and flexibility. Normally, a typical vinyl tile contains approximately about 200 parts of filler material per 100 parts of resin base. It has been found that the addition of just minor amounts of the indicated chlorinated polyethylene to the vinyl resin produces a binder to which substantially increased amounts of low cost filler may be added and still produce a floor composition of superior properties. Thus, total cost of raw materials employed in producing the flooring compositions is reduced by the present invention by as much as a very significant 10%, or even more. The compositions provided by the present invention are therefore comprised of: (A) 100 parts of resin binder composed of about 5 to 30%, preferably 8 to 25%, of chlorinated polyethylene and from about 70% to 95%, preferably 75% to 92%, by weight of a vinyl resin selected from the group consisting of polyvinyl chloride, vinyl chloride-vinyl acetate and vinyl chloride-vinylidene chloride copolymers and mixtures of polyvinyl chloride and polyvinyl acetate and/or polyvinylidene chloride containing predominantly polyvinyl chloride, said chlorinated polyethylene having a chlorine content between about 35–55% by weight, preferably 40–50% by weight, crystallinity between about 8% to 35%, preferably between 10% to 30%, as measured by differential thermal analysis, a glass transition temperature of about 19° C.±21° C. for the 35% chlorine content chlorinated polyethylene ranging up to about 71° C.±7° C. for the 55% chlorine content material and high molecular weight corresponding to an intrinsic viscosity between about 3.0 to about 6.0 in o-dichlorobenzene at 100° C.; (B) between about 20 to 60 parts by weight, preferably between 25–40 parts, of plasticizer for said resin binder; and (C) between about 250–600 parts by weight filler, preferably between about 275–500 parts by weight filler.

The addition of the chlorinated polyethylene to the vinyl flooring compositions requires no special procedure and the entire operation for producing floor covering may be carried out in conventional apparatus for the purpose with the one advantageous exception that fingering or edge cracking of the calendering sheet composition is eliminated and scrap production substantially reduced. Calendering temperatures are conventional and may range from about 100° F. to 400° F., more usually between about 125° F. to 375° F., depending largely on the type of floor composition being produced. The vinyl resin employed in the composition may be any of the vinyl chloride resins conventionally employed or suitable for floor covering application. Such vinyl chloride resins include the homopolymers of vinyl chloride and copolymers with vinyl acetate and vinylidene chloride containing predominantly vinyl chloride. Suitable copolymers may be obtained commercially, for example, those containing about 85% vinyl chloride and 15% of vinyl acetate. Satisfactory results may also be obtained with blends of the vinyl chloride polymers and polyvinyl acetate and/or polyvinylidene chloride resins, the blends containing predominantly the polyvinyl chloride resin being generally preferred. The vinyl resins usually employed have molecular weight corresponding to an intrinsic viscosity between about 0.4 to 1.5 in cyclohexanone at 30° C., most desirably an intrinsic viscosity between about 0.6 to 1.3 in cyclohexanone at 30° C. Such vinyl resins also usually have a density between about 1.2 to 1.5, more usually about 1.3 to 1.4.

The chlorinated polyethylene found to eliminate fingering in processing of vinyl tile compositions is a specific high molecular weight chlorinated polymer of ethylene derived by chlorination of a low pressure, high density, highly crystalline, high molecular weight polymer of ethylene. The terms "linear" or "substantially linear," as used herein and the appended claims, shall mean a polyethylene characterized by high density and at most only nominal short chain branching in the form of methyl groups, usually less than about 10 methyl groups per 1,000 carbon atoms in the molecule, more commonly 0 to 5 methyl groups per 1,000 carbon atoms. Density of such linear polyethylene is at least about 0.93, usually between about 0.935 to 0.985. The molecular weight of the polyethylene starting material is at least approximately 700,000 ranging up to about 5,000,000, preferably between about 1,000,000 to 3,000,000. The chlorinated polyethylene is desirably produced from such high molecular weight polyethylene by chlorination in a medium which remains heterogeneous with respect to the polymer during chlorination. Most preferably the chlorination is carried out in aqueous slurry under controlled temperature and chlorine feed conditions. Chlorination temperatures are desirably regulated between 80° C. to 120° C., preferably between about 90° C. to 120° C., with control being effected to avoid any substantial periods during which the temperature approaches or exceeds the crystalline melting point of the polyethylene, particularly after the first 17% by weight chlorine has been added to the polymer. Preferably, the chlorination is commenced at the lower temperatures between about 80–110° C. and increased slowly after addition of the first 10–20% chlorine to higher temperature between 105° C.–120° C. Rate of chlorination is desirably controlled such that the rate of chlorine introduction is between about 0.05 to 0.5 pound of chlorine per pound of polyethylene charged per hour. Preferably, the chlorination is initiated at a lower feed rate between about 0.1 to 0.2 until the first 10–20% chlorine is added and then increased to a higher rate between about 0.2 to 0.5 pound of chlorine per pound of polyethylene per hour. Chlorination time depends upon rate of chlorine introduction and is usually a matter of several hours until the desired 35–55% by weight chlorine is added to the polyethylene. The particularly preferred chlorinated polyethylenes have a chlorine content between about 40–50% by weight. The chlorinated polymers of ethylene employed in the invention also have characteristic crystallinity and glass transition temperatures which are also important factors in eliminating fingering of the calendered vinyl sheet and producing a floor covering of superior properties. Such chlorinated polyethylenes are crystalline materials in that they contain residual polyethylene crystallinity in an amount of at least 8% up to about 35% as measured by differential thermal analysis. In providing such crystalline chlorinated polyethylenes it is required to have a polyethylene starting material of high crystallinity of at least about 70%, preferably 75% to 90%, and to conduct the chlorination as above described to produce a chlorinated polyethylene in which the desired amount of crystallinity is retained. Preferably, the chlorinated polyethylene has crystallinity between about 10% to 30% as measured by differential thermal analysis. Glass transition temperatures of the chlorinated polyethylenes employed in the invention range from about 19° C.±21° C. for the 35% chlorine chlorinated polyethylene up to about 71° C.±7° C. for the 55% chlorine material. The more preferred chlorinated polyethylenes of 40–50% chlorine have glass transition temperatures ranging from about 27° C.±20° C. for the 40% chlorine content chlorinated polyethylene up to about 51° C.±14° C. for the 50% chlorine content polymer. Glass transition temperatures for other chlorinated polyethylenes within the 35–55% chlorine content range may be readily determined by plotting the values indicated for the four chlorine contents given, substantially as shown on the accompanying drawing. On the graphic diagram of the drawing curves A and C define the upper and lower limits respectively of the glass transition temperatures with the cross-hatched section therebetween representing the effective area for use in the present invention. The dotted curve B is that obtained by plotting of the four specific glass transition temperatures given above and gives approximately the preferred values for a given chlorine content. The glass transition temperature itself is a second order transition temperature and can be determined by plotting stiffness modulus of the sample as a function of temperature, and can be defined as the temperature at which the stiffness modulus of the sample possesses a value of $1.45 \times 10^4$ p.s.i. or $10^9$ dynes/cm.$^2$. The determination may be made in accordance with ASTM Test D1053–61.

Plasticizer is incorporated in the vinyl flooring composition of the invention in an amount generally between about 20 to 60 parts by weight per 100 parts of the vinyl chloride-chlorinated polyethylene resin base. Preferably, the amount of plasticizer is between about 25 to 40 parts per 100 parts of the resin binder. The optimum amount of plasticizer in any given floor tile composition depends largely on amount of filler and chlorinated polyethylene employed. The plasticizers which may be employed in the composition are those generally suitable for use in vinyl flooring compositions. Such plasticizers include the ester type plasticizers and the epoxidized dying oils. The more preferred esters are the monomeric esters of acids such as phosphoric, phthalic, adipic, sebacic, etc. Suitable alcohols for forming the monomeric esters having generally about 4 to 16 carbon atoms, more usually 4 to 12 carbon atoms. Examples of such plasticizers include tricresyl phosphate, dioctyl phthalate, 2-ethylhexyl phthalate, diisodecyl phthalate, butylcyclohexyl phthalate, dicyclohexyl phthalate, dicapryl phthalate, dioctyl adipate, and dibutyl sebacate. Epoxidized soya beans oil is a preferred example of an epoxidized drying oil which may be used in formulation of the tile compositions.

The method of the present invention may be employed to produce both the "semiflexible" and "flexible" type vinyl floor products. The "flexible" type flooring compositions are those containing essentially the granular or pigment-type fillers. Examples of granular and pigment fillers include the clays, calcium carbonate, barytes, asbestine, talc, calcium sulfate, silica, mica, etc., as well as conventional colored pigments such as titanium dioxide, carbon black, phthalocyanine green or blue, chrome yellows, etc. Coarse fillers such as pulverized marble or limestone may also be used, if desired. The so called "semiflexible" compositions are those containing fibrous fillers, for example, asbestos, cork, wood flour, etc., usually asbestos. The "semiflexible" compositions may have somewhat higher filler loadings for a given resin binder than the "flexible" tile compositions by reason of the binding and mechanical properties contributed by the fibrous fillers incorporated in such "semiflexible" compositions. The "semiflexible" vinyl flooring compositions conventionally contain granular and/or pigment type filler and may be viewed as having the make-up of the "flexible" type products in which typically 50–150 parts of fibrous filler are incorporated per 100 parts of resin binder. Of course, various other combinations of pigment or coarse and fibrous fillers may be used. The addition of the high molecular weight chlorinated polyethylene to the vinyl resin binder has been found to permit the incorporation of significantly larger amounts of filler in the composition than previously possible with the binders containing only the vinyl polymers. Hence, the present invention permits substantial savings in production of a superior flooring composition not only by reason of elimination of the edge cracking of the calendered sheets but also by reason of incorporation of greater amounts of low cost filler material. Thus, the heretofore conventional vinyl binder permitted the incorporation of only about 200 parts of filler in "flexible" type composition without depreciation of required properties for a floor covering. The "flexible" type compositions produced by the present invention may have incorporated therein anywhere from about 250 to 550 parts by weight of particulate filler material per 100 parts of resin binder, the optimum amount of filler employed in any given case being approximately proportional to the amount of the chlorinated polyethylene employed in the resin binder. The "semiflexible" compositions provided by the invention will have about 325–600 parts of filler of which about 50–150 parts will be fibrous filler. "Flexible" type compositions having a preferred resin binder containing between about 8–25% of the chlorinated polyethylene may be loaded with between about 275–500 parts of filler per 100 parts resin binder without loss of the combination of properties required for a floor tile composition. The "semiflexible" compositions having such a preferred resin binder will usually contain about 325–550 parts filler of which preferably about 50–150 parts will be fibrous filler. Despite such high filler loading the composition of the invention not only have all properties required for floor covering but also are superior in certain respects, including chemical and stain resistance and flexibility.

Stabilizers may also be included in the compositions to protect the vinyl polymer and chlorinated polyethylene against possible decomposition by the heat of processing, etc. Such stabilizers as are conventional in the preparation of vinyl polymer and copolymer sheet compositions are suitable, for example, organic complexes and/or salts of lead, tin, barium, cadmium, zinc, sodium, etc. The usual small quantities of such stabilizers are effective; for instance, 2 to 10 parts per 100 parts of the resin binder.

The chlorinated polyethylenes found to eliminate fingering of the vinyl flooring compositions during calendering are derived by chlorination of linear, highly crystalline, high density polyethylene having ultrahigh molecular weight such that the chlorinated linear polyethylene produced therefrom has high weight average molecular weight corresponding to an intrinsic viscosity of at least about 3.0 to 6.0 in o-dichlorobenzene at 100° C. The more preferred chlorinated polyethylenes have weight averabe molecular weight corresponding to an intrinsic viscosity between about 3.6 to 5.0. Suitable linear, highly crystalline polyethylene starting material will have weight average molecular weight of at least approximately 700,000 up to about 5,000,000. Particularly suitable linear high molecular weight polyethylene which may also be characterized by containing long chain polyethylene branches is produced, as described particularly in Example 6 of British Patent 858,674 of June 11, 1961, by gas phase polymerization of anhydrous, oxygen free ethylene below the softening point of the polyethylene over a porous, frangible catalyst of an inorganc compound of chromium and oxygen and an active metal alkyl on a support of the group consisting of silica and silica-alumina. The polyethylene produced thereby contain residue of the chrominum-silica catalyst systems dispersed throughout the polyethylene in an amount of at least about .001%, usually .001–.002% by weight. The chromium-silica catalyst material added during polymerization is retained in the polyethylene during chlorination and contributes to the characteristic properties of the chlorinated polyethylene produced therefrom. Prior to chlorination such polyethylene has a density between 0.935 to 0.985 and a crystallinity of at least 75%, and customarily in the range of 75% to 85%, as determined by differential thermal analysis. The preferred polyethylenes produced by British Patent 858,674 have weight average molecular weight between 1.0 million and about 5.0 million, more usually between 1.0 to 3.5 million, as calculated according to the method of P. S. Francis et al. from the viscosity of about 0.05 to 0.1 gram per 100 cc. solution in Decalin at 135° C. using the equation:

$$n = 6.77 \times 10^4 M^{0.67}$$

where $n$=intrinsic viscosity,
$M$=weight average molecular weight
(J. Polymer Science, vol. 31, pp. 453–466, September 1958).

The following examples in which parts and percentages are by weight demonstrate the practice and advantages of the present invention. In the examples the production of vinyl flooring compositions as conventionally practiced commercially was simulated as to both apparatus and procedure except that the work was done on a laboratory scale. In Example 1 the chlorinated polyethylene employed in the invention was added to a control formulation of the type conventionally employed for producing "flexible" type vinyl floor covering. In Example 2 a floor covering was prepared from the control formulation used in Example 1 for comparison with the results obtained in Example 1. In Example 3 the same chlorinated polyethylene was added to a control formulation of the type conventionally employed in producing "semiflexible" asbestos floor tiles. In Example 4 the control formulation of Example 3 was employed in preparation of floor tile for comparison with the results obtained in Example 3. The chlorinated polyethylene employed in the examples had a chlorine content of 45%, a crystallinity of about 20% as measured by differential thermal analysis, a glass transition temperature of about 38° C. as determined by ASTM Test D1053–61, and a weight average molecular weight corresponding to an intrinsic viscosity of 4.0 in o-dichlorobenzene at 100° C. The chlorinated polyethylene was prepared by chlorination in aqueous slurry from a polyethylene having a weight average molecular weight of about 1.6 million and produced in accordance with Example 6 of British Patent 858,674. In preparing the polyethylene the catalyst system was magnesium dichromate on a porous silica-alumina support with aluminum triisobutyl. The chlorination of the polyethylene was conducted in about 20 times its weight of water and commenced at a temperature of 100° C. and at a chlorine feed rate of 0.2 pound of chlorine per pound of polyethylene charged per hour. The chlorination temperature and feed rate were maintained fairly constant until sampling showed that about 17% chlorine have been added to the polyethylene. Chlorination was continued at an increased temperature of 110° C. and at a chlorine feed rate of about 0.3–0.5 pound of chlorine per pound of polyethylene charge per hour to add the desired 45% chlorine to the polyethylene.

EXAMPLE 1

The "flexible" flooring composition employed in this example had the following formulation.

Table 1

| Component: | Parts |
| --- | --- |
| Polyvinyl chloride | 90 |
| Chlorinated polyethylene | 10 |
| Dioctyl phthalate | 30 |
| Epoxidized soya bean oil | 5 |
| Titanium dioxide | 20 |
| "Metasap" 635 | 3 |
| Stearic acid | 1.5 |
| Polyethylene wax | 1 |
| Calcium carbonate filler | 300 |

In the above formulation the polyvinyl chloride had a weight average molecular weight corresponding to an intrinsic viscosity of about 1.3 in cyclohexanone at 30° C. "Metasap" 635 in a trademark for a barium zinc soap stabilizer. The calcium carbonate filler was obtained under the trademark "Atomite." The polyethylene wax was obtained under the trademark "AC" PE-617 and the epoxidized soya bean oil under the trademark "Paraplex" G-62.

The composition formulated as above was charged to a laboratory Banbury mixer, model No. B, and compounded therein for about 5–10 minutes at a drop temperature of 350° F. and at ram pressure of 40 p.s.i. From the Banbury the stock was fed to an 8 inch by 16 inch differential two-roll mill and sheeted out therefrom at differential roll temperatures of about 250° F. and 350° F. The stock from the roll mill was pulverized and then fed to calender having four rolls in conventional inverted L-shaped arrangement. The upper two calender rolls were heated to between 280–300° F., the intermediate calender roll to 280–310° F., and the lower calender roll to between 290–320° F. The pulverized compound at about 260° F. was fed between the nip of the two upper calender rolls, then between the nip of the top and intermediate rolls, and then between the nip of the intermediate and lower rolls, the resulting sheet being led beneath the lower calender roll and recovered. The calender sheet had a width of about 12 inches and thickness of 30 mils. The entire operation was conducted and proceeded as in conventional manufacture of "flexible" type vinyl sheet floor covering with the surprising exception that the calendered sheet exhibited no "fingering" or cracking at the edges which were unusually smooth with only minor irregularities. It was determined that only nominal trimming of each side of the sheet (less than ¾ inch in commercial scale operation) would be required to produce a saleable product. Evaluation of the calender sheet showed that it possessed all the required properties for vinyl floor covering and in fact had even been improved with respect to the properties stain and chemical resistance, flexibility and filler loadability. It was also determined that the high filler loadability effected by the addition of just 10 parts of the chlorinated polyethylene in Formulation 1 would result in a 10% reduction in raw material cost of the floor product.

EXAMPLE 2 (COMPARISON)

The operation carried out in Example 1 was repeated except that the chlorinated polyethylene was omitted from the composition of Formulation 1 which was further modified to conform to conventional vinyl flooring formulations by increasing the amount of polyvinyl chloride resin to 100 parts and decreasing the amount of dioctyl phthalate to 28 parts and the amount of calcium carbonate filler to 200 parts. The calendering operation resulted in a sheet which was "fingered" or frequently cracked along its edges to a penetration of 1½–2 inches (equivalent to the 4–5 inch cracks encountered in the conventional commercial scale operations for producing "flexible" vinyl flooring covering). The calendered sheet was also very rough and highly irregular at the edges and and it was determined that at least the usual 6 inches would have to be cut from each side of the commercial scale sheet to eliminate such roughness and the cracked edges thereof and produce a saleable product.

EXAMPLE 3

In this example "semiflexible" asbestos floor tiles were prepared from the following formulation:

Table 2

| Component: | Parts |
| --- | --- |
| Vinyl chloride-vinyl acetate copolymer | 62.5 |
| Chlorinated polyethylene | 10.0 |
| "Elastex" 50-B | 27.5 |
| "Metasap" 635 | 5.0 |
| Stearic acid | 2.0 |
| Asbestos | 99.0 |
| "Atomite" | 297.0 |

In the formulation of Table 2 the vinyl copolymer was a copolymer produced from 87% vinyl chloride and 13% vinyl acetate. The copolymer was obtained under the trademarks "Bakelite" VYHH. "Elastex" 50-B is a trademark for butyl cyclohexyl phthalate plasticizer.

The composition of Formulation 2 was charged to the model B Banbury mixer and compounded for about 5–10 minutes at a drop temperature of 350° F. and ram pressure of 40 p.s.i. The stock from the Banbury was fed to an 8 inch by 16 inch differential two-roll and sheeted out at differential roll temperature of about 250° F. and 300° F. The sheet from the roll mill was passed directly into the nip of a two-roll calender heated to a temperature of 100–140° F. and sheeted out therefrom as an 18 inch wide sheet which was cut in 9 inch by 9 inch by ⅛ inch tiles. The entire operation was conducted and proceeded as in conventional "semiflexible" floor tile manufacture but again with the desirable exception that the calendered sheet exhibited no "fingering" or cracking at the edges which were unusually smooth and even. It was determined that tiles could be cut from the calendered sheet with only nominal loss of the sheet (less than 1 inch on each side of the sheet in the commercial scale operation). Evaluation of the product again showed all required properties for "semiflexible" floor tiles along with better stain and chemical resistance, particularly with respect to ketone solvents such as methyl ethyl ketone, improved flexibility and filler loadability. It was again determined that the high filler loading capacity effected by addition of only about 14% of the chlorinated polyethylene in the binder would result in a 10% reduction in raw material cost of the product.

EXAMPLE 4 (COMPARISON)

The operation carried out in Example 3 was repeated except that the chlorinated polyethylene was omitted from the composition of Formulation 2 which was further modified to conform to conventional "semiflexible" tile compositions by increasing the amount of the vinyl chloride-vinyl acetate copolymer to 75 parts and the amount of asbestos to 100 parts and by reducing the amount of "Elastex" 50-B plasticizer to 25 parts and the amount of calcium carbonate to 200 parts. The calendering operation resulted in fingering or frequent cracking of the sheet along its edges to a penetration of 1¾–2½ inches (equivalent to the 4–5 inch cracks encountered in the conventional commercial operations for "semiflexible" vinyl tiles). The calender sheet was rough and uneven at the edges and it was determined that on the conventional commercial scale the usual six inch wide strip on each side of the sheet could not be used in cutting satisfactory tiles.

Intrinsic viscosity, as the term is used herein, is defined as the limit, at infinite dilution, of specific viscosity ($N_{sp}$) divided by concentration (C) expressed in grams of resin per deciliter of solution. Specific viscosity is measured as: $(t-t_0)/t_0$, where $t$ is the effluent time for a given quantity of polymer solution from a standard pipet and $t_0$ is the effluent time for an equal quantity of the pure solvent. Intrinsic viscosity can be determined, by plotting ($N_{sp}/C$) against C, at low concentrations, and extrapolating the resulting curve to 0 concentration.

The intrinsic viscosities reported herein are determined in accordance with ASTM Test D1601–61, the units thereof being deciliters per gram. Intrinsic viscosities of the chlorinated polymers of this invention herein reported are in orthodichlorobenzene solvent at 100° C.; and for ethylene polymers herein the intrinsic viscosities are in decalin solvent at 135° C.

The densities of polymers reported herein are determined by ASTM Test D792–60T at 23° C. and are in units of grams per milliliter.

Although certain preferred embodiments of the invention have been disclosed for purpose of illustration, it will be evident that various changes and modifications may be made therein without departing from the scope and spirit of the invention.

I claim:

1. An improved plasticized and highly filled vinyl composition suitable for floor covering comprising: (A) 100 parts of resin binder composed of about 70% to 95% by weight of a vinyl polymer resin selected from the group consisting of polyvinyl chloride, vinyl chloride-vinyl acetate and vinyl chloride-vinylidene copolymers containing at least about 85% vinyl chloride, and polyvinyl chloride-polyvinyl acetate and polyvinyl chloride-polyvinylidene chloride mixtures containing at least about 85% polyvinyl chloride; (B) about 20 to 60 parts by weight plasticizer for said resin binder; and (C) about 250–600 parts by weight filler; wherein the improvement comprises incorporating about 5% to 30% of a chlorinated linear polyethylene having a chlorine content between about 35–55% by weight, crystallinity between about 8% to 35% as measured by differential thermal analysis, a glass transition temperature ranging from about 19° C.±21° C. for the 35% chlorine content chlorinated polyethylene up to about 71° C.±7° C. for the 55% chlorine content chlorinated polymer, and high molecular weight corresponding to an intrinsic viscosity of at least 3.0 to 6.0 dl./gm. in o-dichlorobenzene at 100° C.

2. The floor covering composition of claim 1 in which the chlorinated polyethylene has a chlorine content between about 40–50% by weight and crystallinity between about 10% to 30% as measured by differential thermal analysis.

3. The floor covering composition of claim 1 in which the resin binder is composed of 75–92% polyvinyl chloride and 8–25% of said chlorinated polyethylene, and in which said composition has incorporated therein between 275–500 parts filler.

4. The floor covering composition of claim 1 in which the resin binder is composed of 75–92% of a vinyl chloride-vinyl acetate copolymer containing at least about 85% vinyl chloride and 8–25% of said chlorinated polyethylene, and in which said composition has incorporated therein between 325–550 total parts of filler of which 50–150 parts is fibrous filler.

5. In the manufacture of plasticized and filled vinyl products suitable for floor covering involving the compounding and sheet calendering of plasticized and filled compositions containing as resin binder a vinyl polymer resin selected from the group consisting of polyvinyl chloride, vinyl chloride-vinyl acetate and vinyl chloride-vinylidene copolymers containing at least about 85% vinyl chloride, and polyvinyl chloride-polyvinyl acetate and polyvinyl chloride-polyvinylidene chloride mixtures containing at least about 85% polyvinyl chloride; the improvement of eliminating edge cracking of the sheet during calendering by incorporating in the resin binder between about 5% to 30% by weight of the binder of a chlorinated linear polyethylene having a chlorine content between about 35–55% by weight, crystallinity between about 8% to 35% as measured by differential thermal analysis, a glass transition temperature ranging from about 19° C.±21° C. for the 35% chlorine content chlorinated polyethylene up to about 71° C.±7° C. for the 55% chlorine content chlorinated polymer and high molecular weight corresponding to an intrinsic viscosity of at least 3.0 to 6.0 dl./gm. in o-dichlorobenzene at 100° C.

6. The method of claim 5 in which the chlorinated polyethylene has a chlorine content between about 40–50% by weight and crystallinity between about 10% to 30% as measured by differential thermal analysis.

7. The method of claim 5 in which the resin binder is composed of 75–92% polyvinyl chloride and 8–25% of said chlorinated polyethylene, and in which said composition has incorporated therein between 275–500 parts filler.

8. The method of claim 5 in which the resin binder is composed of 75–92% of a polyvinyl chloride-vinyl acetate copolymer containing predominantly vinyl chloride and 8–25% of said chlorinated polyethylene, and in which said composition has incorporated therein between 325–550 total parts of filler of which 50–150 parts is fibrous filler.

References Cited

UNITED STATES PATENTS

| | | | |
|---|---|---|---|
| 2,558,378 | 6/1951 | Petry | 260—41 |
| 2,889,398 | 8/1959 | Pflaumer | 260—23 |
| 3,165,560 | 1/1965 | Frey et al. | 260—897 |
| 3,194,775 | 7/1965 | Bartlett | 260—28.5 |
| 3,211,689 | 10/1965 | Darby | 260—41 |
| 2,516,591 | 7/1950 | Remington | 260—41.5 |
| 3,291,863 | 12/1966 | Frey et al. | 260—897 |

DONALD E. CZAJA, *Primary Examiner.*

R. A. WHITE, *Assistant Examiner.*